(12) United States Patent
Chae et al.

(10) Patent No.: US 7,706,122 B2
(45) Date of Patent: Apr. 27, 2010

(54) ANALOG CONTROL ASIC APPARATUS FOR HIGH VOLTAGE POWER SUPPLY IN IMAGE FORMING APPARATUS AND METHOD FOR CONTROLLING HIGH VOLTAGE POWER SUPPLY

(75) Inventors: Young-min Chae, Suwon-si (KR);
Joong-gi Kwon, Gunpo-si (KR);
Chul-woo Oh, Suwon-si (KR);
Jong-hwa Cho, Suwon-si (KR);
Sang-yong Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1036 days.

(21) Appl. No.: 11/344,093

(22) Filed: Feb. 1, 2006

(65) Prior Publication Data

US 2006/0176717 A1    Aug. 10, 2006

(30) Foreign Application Priority Data

Feb. 2, 2005    (KR) ...................... 10-2005-0009733

(51) Int. Cl.
*G03G 15/02* (2006.01)

(52) U.S. Cl. ...................................... 361/235; 399/170

(58) Field of Classification Search ................ 399/170; 361/235; 363/59, 51

See application file for complete search history.

(56) References Cited

U.S. PATENT DOCUMENTS 4,714,978 A * 12/1987 Coleman ................... 361/235

| | | | |
|---|---|---|---|
| 6,381,151 B1 * | 4/2002 | Jang | 363/21.01 |
| 7,187,565 B2 * | 3/2007 | Chae | 363/69 |
| 2004/0000897 A1 | 1/2004 | Asayama | |
| 2004/0228049 A1 | 11/2004 | Chae et al. | |

FOREIGN PATENT DOCUMENTS

| CN | 2133083 Y | 5/1993 |
|---|---|---|
| CN | 1457545 | 11/2003 |
| JP | 07020953 | 1/1995 |
| JP | 10243651 | 9/1998 |

* cited by examiner

*Primary Examiner*—Shawn Riley
(74) *Attorney, Agent, or Firm*—Roylance, Abrams, Berdo & Goodman, L.L.P.

(57) ABSTRACT

An analog control application specific integrated circuit (ASIC) apparatus for a high voltage power supply (HVPS) in an image for apparatus, and a method for controlling the HVPS are provided. The HVPS includes a transformer transforming an AC signal to a high voltage signal and a voltage doubler outputting a DC high voltage for the HVPS. The ASIC includes an analog control circuit configured as a one-chip ASIC that converts a predetermined DC level signal to a high frequency switching signal using a switching component and outputs the converted high frequency switching signal to a primary winding of the transformer. If the high voltage output signal output from the voltage doubler is not feedbacked, the switching component high frequency switches a received driving signal of a gate driver, and outputs the high frequency switched signal to the transformer.

13 Claims, 7 Drawing Sheets

ANALOG CONTROL ASIC APPARATUS FOR HIGH VOLTAGE POWER SUPPLY IN IMAGE FORMING APPARATUS AND METHOD FOR CONTROLLING HIGH VOLTAGE POWER SUPPLY

CROSS-REFERENCE TO RELATED PATENT APPLICATION

This application claims the benefit under 35 U.S.C. § 119(a) of Korean Patent Application No. 10-2005-0009733, filed on Feb. 2, 2005, in the Korean Intellectual Property Office, the entire disclosure of which is hereby incorporated by reference.

BACKGROUND OF THE INVENTION

1. Field of the Invention

The present invention relates to a high voltage power supply (HVPS) of an image forming apparatus and a method for controlling the HVPS. More particularly, the present invention relates to an analog control application specific integrated circuit (ASIC) apparatus for an HVPS in an image forming apparatus.

2. Description of the Related Art

Figure 1:
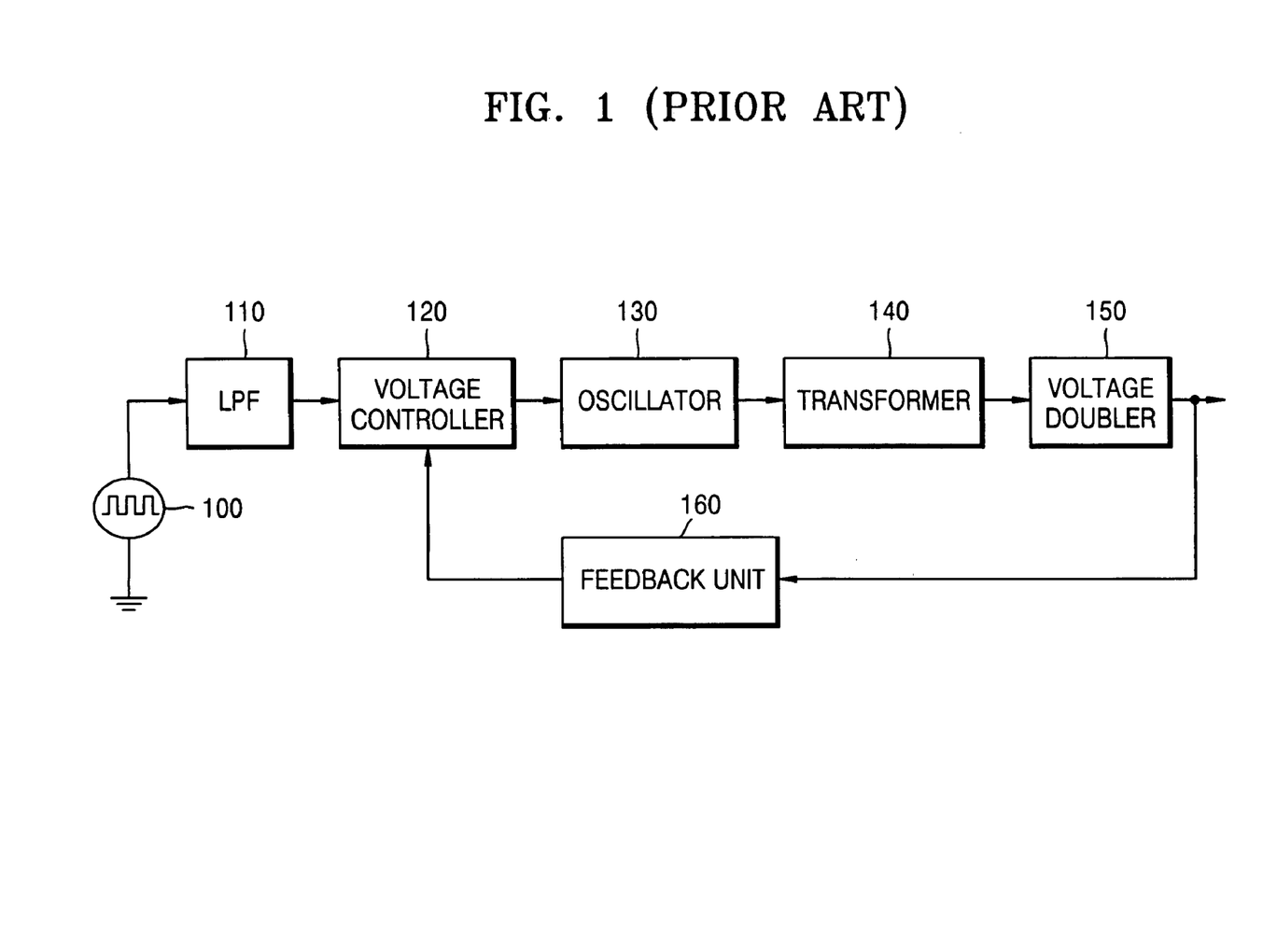
FIG. 1 is a control block diagram of an HVPS for one output.
Figure 2:
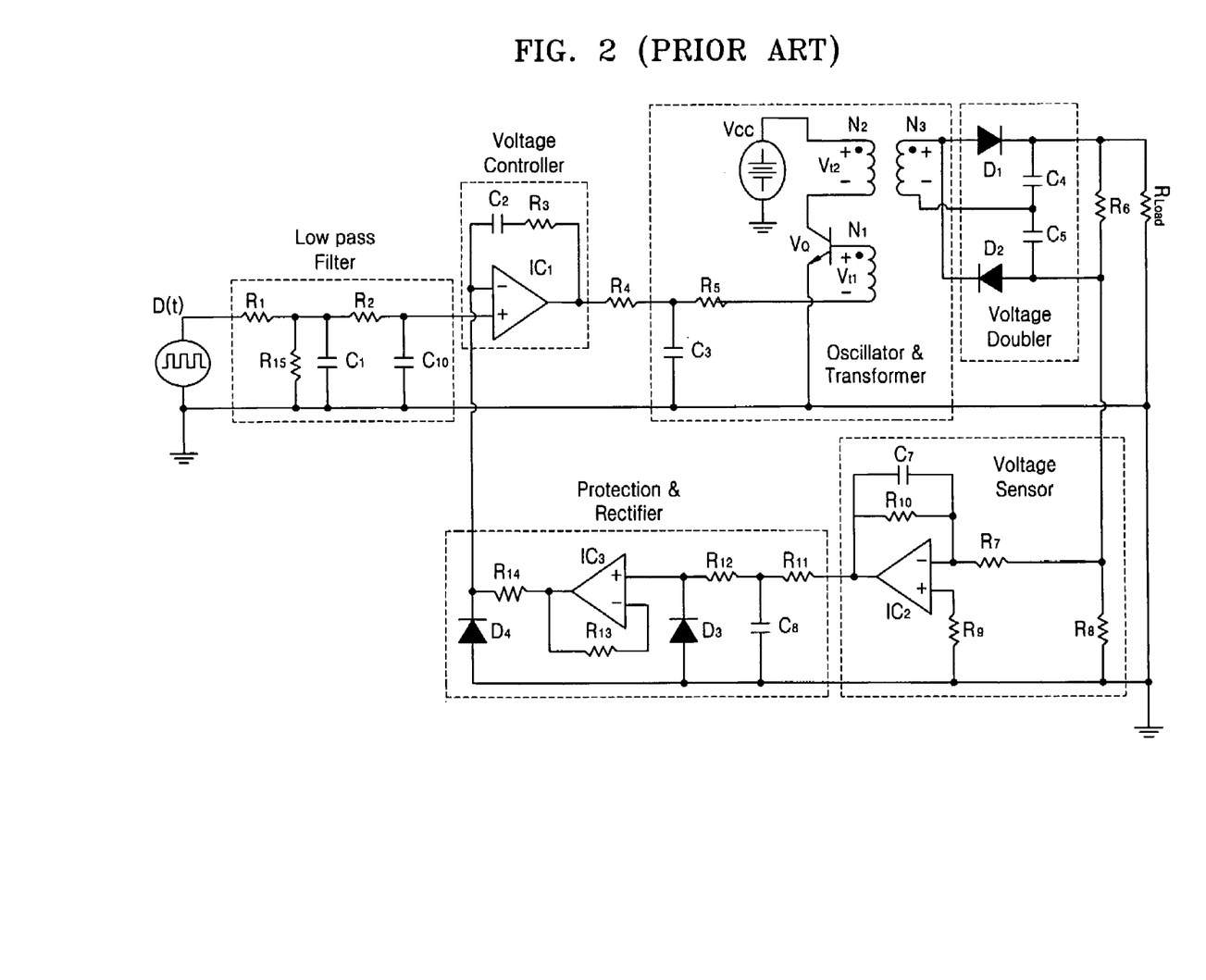
FIG. 2 is an illustration of a circuit diagram of FIG. 1.

FIG. 1 is a control block diagram of a high voltage power supply (HVPS) for one output. The HVPS for one output includes a pulse width modulation (PWM) input unit 100, a low pass filter (LPF) 110, a voltage controller 120, an oscillator 130, a transformer 140, a voltage doubler 150, and a feedback unit 160. FIG. 2 is an illustration of a circuit diagram of FIG. 1.

The PWM input unit 100 receives a PWM input signal of several KHz, and an output voltage level is determined according to a duty ratio of the PWM input signal. The LPF 110 converts the PWM input signal to a DC signal using an RC two-stage filter, and the converted DC signal is used as a reference signal for controlling an output voltage. The voltage controller 120 operates as a differential circuit and a controller in which an error signal is amplified based on the output voltage reference signal output from the LPF 110 and a voltage sensor signal to detect an actual feedbacked output voltage. The oscillator 130 changes a voltage between an emitter and a collector of a transistor by controlling a magnitude of a base current of the transistor based on an output of the voltage controller 120. When the voltage between the emitter and the collector of the transistor in the oscillator 130 is changed, a voltage of the primary winding of the transformer 140 connected to the oscillator 130 in series is changed. Then an output voltage is induced due to a high turn ratio. The voltage doubler 150 generates a final DC high voltage from a secondary voltage of the transformer 140 using a voltage doubling circuit including a diode rectifier and capacitors. The feedback unit 160 is a protect circuit sensing the final DC high voltage, distributing the output voltage through a resistor, and preventing an abnormal voltage from being applied.

Figure 3:
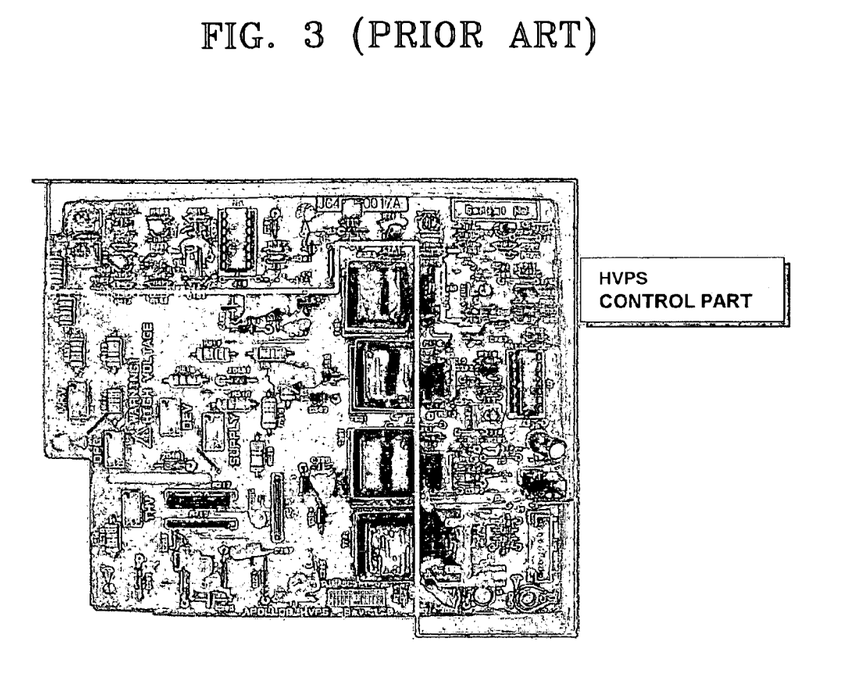
FIG. 3 is an example of a conventional analog control unit of the HVPS.

As described above, many components should be assembled to construct the analog control unit in the primary side of the transformer 140. That is, the analog control unit is constructed with resistors, capacitors, transistors, integrated circuits (ICs), and diodes as shown in FIG. 2. FIG. 3 is an example of a conventional analog control unit of the HVPS. Since there are a number of components, the number of procedures and a working time increase in an assembly process, and a printer circuit board (PCB) space should be prepared. In addition, an output voltage may be distorted due to a characteristic deviation between the components, and a unit component may be rendered defective due to an outside cause.

Accordingly, there is a need for an improved high voltage power supply in an image forming apparatus with reduced components.

SUMMARY OF THE INVENTION

An aspect of embodiments of the present invention is to address at least the above problems and/or disadvantages and to provide at least the advantages described below. Accordingly, an aspect of embodiments of the present invention is to provide an analog control application specific integrated circuit (ASIC) apparatus for a high voltage power supply (HVPS) in an image forming apparatus and a method for controlling the HVPS, which facilitate space utilization, simplification of an assembly process, and cost reduction through mass production by configuring a control unit in the primary side of a transformer of the HVPS as one-chip analog ASIC.

According to an aspect of an exemplary embodiment of the present invention, there is provided an analog control application specific integrated circuit (ASIC) apparatus for a high voltage power supply (HVPS) in an image forming apparatus. The HVPS in the image forming apparatus comprises a transformer transforming an AC signal having a predetermined frequency to a high voltage signal and a voltage doubler outputting a DC high voltage for the HVPS in the image forming apparatus by rectifying and doubling a secondary high voltage signal of the transformer. The analog control ASIC apparatus comprising an analog control circuit, which is configured as one-chip ASIC, that converts a predetermined DC level signal to a high frequency switching signal using a switching component and outputting the converted high frequency switching signal to a primary winding of the transformer.

If the high voltage output signal output from the voltage doubler is not feedbacked, the analog control circuit may comprise a voltage controller amplifying the DC level signal; a pulse width modulation (PWM) modulator PWM modulating a signal output from the voltage controller using a predetermined carrier signal; a gate driver driving a signal modulated by the PWM modulator as a signal input to the gate of the switching component; and the switching component receiving the driving signal of the gate driver through the gate, high frequency switching the received driving signal, and outputting the high frequency switched signal to the transformer. Here, the switching component may be a metal oxide semiconductor field effect transistor (MOSFET).

The analog control circuit may further comprise a low pass filter (LPF) converting a PWM signal having a predetermined duty ratio to a DC signal and outputting the converted DC signal to the voltage controller in order to use the DC signal as a reference signal for controlling the high voltage output signal.

The analog control circuit may further comprise a feedback unit sensing the high voltage output signal and feeding back the sensed high voltage output signal to the voltage controller, wherein the voltage controller may amplify an error signal obtained by differentiating the output voltage reference signal and the output voltage of the voltage doubler sensed by the feedback unit. The high voltage output signal sensed by the feedback unit may be a voltage or a current. The feedback unit may comprise a voltage sensor sensing and filtering the high voltage output signal, and a protector & rectifier buffering a signal sensed by the voltage sensor, clamping the buffered signal, and outputting the clamped signal to the voltage controller.

According to another aspect of an exemplary embodiment of the present invention, there is provided an analog control application specific integrated circuit (ASIC) apparatus for a high voltage power supply (HVPS) in an image forming apparatus. The analog control ASIC apparatus comprising two or more analog control apparatuses for the HVPS in the image forming apparatus described above, which are configured as one-chip ASIC. Some of the analog control apparatuses for the HVPS in the image forming apparatus may be double connected to each other.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An analog control application specific integrated circuit (ASIC) apparatus for a high voltage power supply (HVPS) in an image forming apparatus according to an exemplary embodiment of the present invention will now be described in detail with reference to the accompanying drawings.

Figure 4:
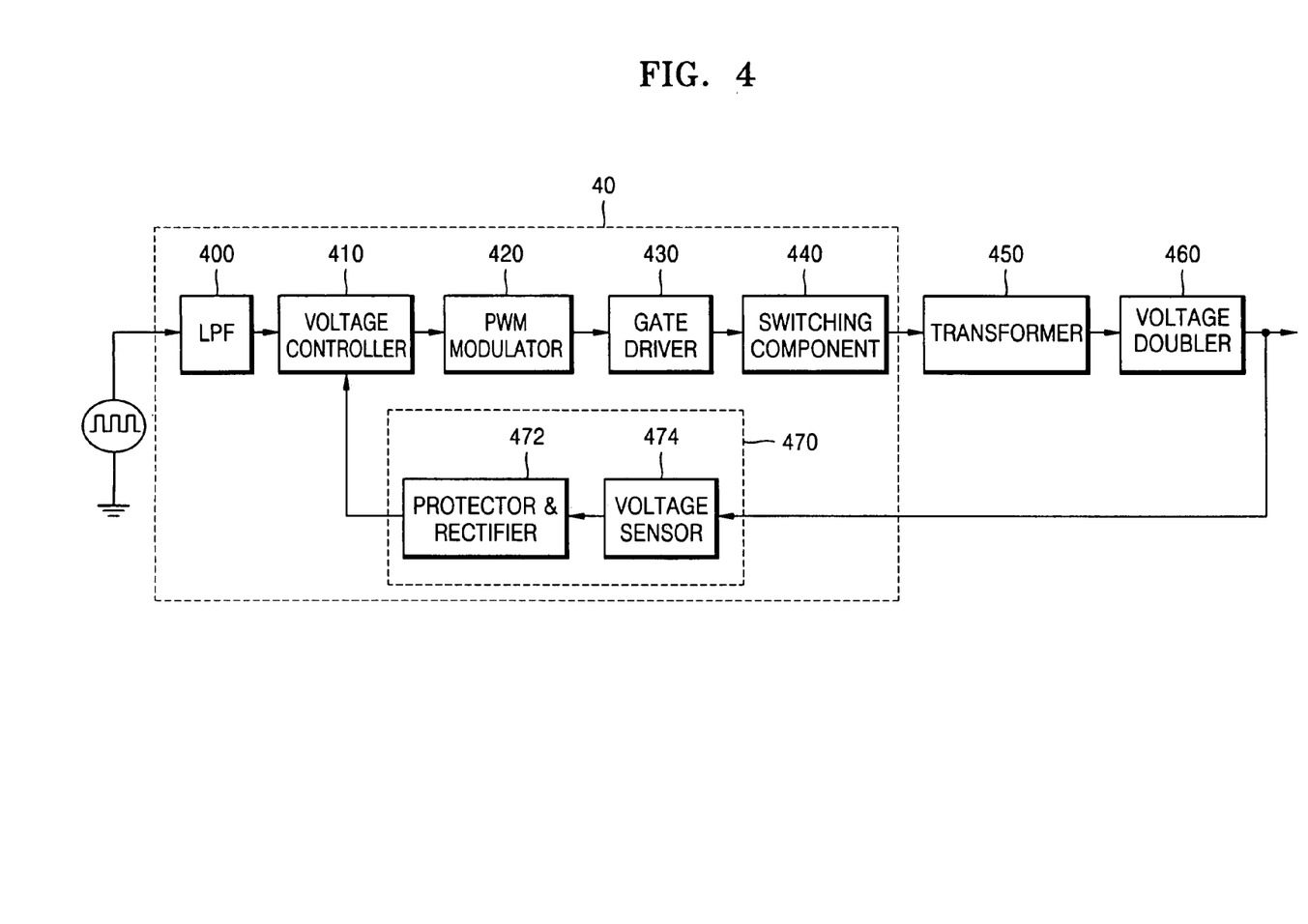
FIG. 4 is a block diagram of an HVPS in an image forming apparatus, which includes an exemplary embodiment of an analog control ASIC apparatus for an HVPS in an image forming apparatus to which the present invention is applied.

FIG. 4 is a block diagram of an HVPS in an image forming apparatus, which includes an exemplary embodiment of an analog control ASIC apparatus for an HVPS in an image forming apparatus to which the present invention is applied.

The HVPS includes an analog control unit 40, a transformer 450, and a voltage doubler 460.

The transformer 450 transforms an AC signal having a predetermined frequency to a high voltage AC signal. The voltage doubler 460 outputs a DC high voltage for the HVPS in the image forming apparatus by rectifying and voltage doubling the secondary high-voltage AC signal of the transformer 450.

The analog control unit 40, which is configured as a one-chip ASIC, converts a predetermined DC level signal to a high frequency switching signal using a switching component and outputs the converted high frequency switching signal to the primary winding of the transformer 450. The analog control unit 40 includes a LPF 400, a voltage controller 410, a PWM modulator 420, a gate driver 430, a switching component 440, and a feedback unit 470.

The LPF 400 converts a PWM signal having a predetermined duty ratio to a DC signal and outputs the converted DC signal to the voltage controller 410 in order to use the DC signal as a reference signal for controlling the high voltage output signal. The LPF 400 can be installed outside the analog control unit 40 without being included in the analog control unit 40 configured as a one-chip ASIC.

The voltage controller 410 amplifies the DC level signal of the LPF 400, if the high-voltage output signal output from the voltage doubler 460 is not feedbacked. The voltage controller 410 also amplifies an error signal obtained by differentiating the output voltage reference signal of the LPF 400 and the output voltage of the voltage doubler 460 sensed by the feedback unit 470, if the high-voltage output signal output from the voltage doubler 460 is feedbacked. The PWM modulator 420 modulates a signal output from the voltage controller 410 using a predetermined carrier signal.

The gate driver 430 drives a signal modulated by the PWM modulator 420 as a signal input to the gate of the switching component 440.

The switching component 440 receives the driving signal of the gate driver 430 through the gate, high frequency switches the received driving signal, and outputs the high frequency switched signal to the transformer 450. In an exemplary implementation, switching component 440 may be a metal oxide semiconductor field effect transistor (MOSFET).

The feedback unit 470 senses the high voltage output signal and feedbacks the sensed high voltage output signal to the voltage controller 410. The feedback unit 470 includes a voltage sensor 474 and a protector & rectifier 472. The high voltage output signal sensed by the feedback unit 470 can be a voltage or a current. The voltage sensor 474 senses and filters the high-voltage output signal of the voltage doubler 460. The protector & rectifier 472 buffers a signal sensed by the voltage sensor 474, clamps the buffered signal, and outputs the clamped signal to the voltage controller 410. The feedback unit 470 may not be used when an open loop control is performed.

Figure 5:
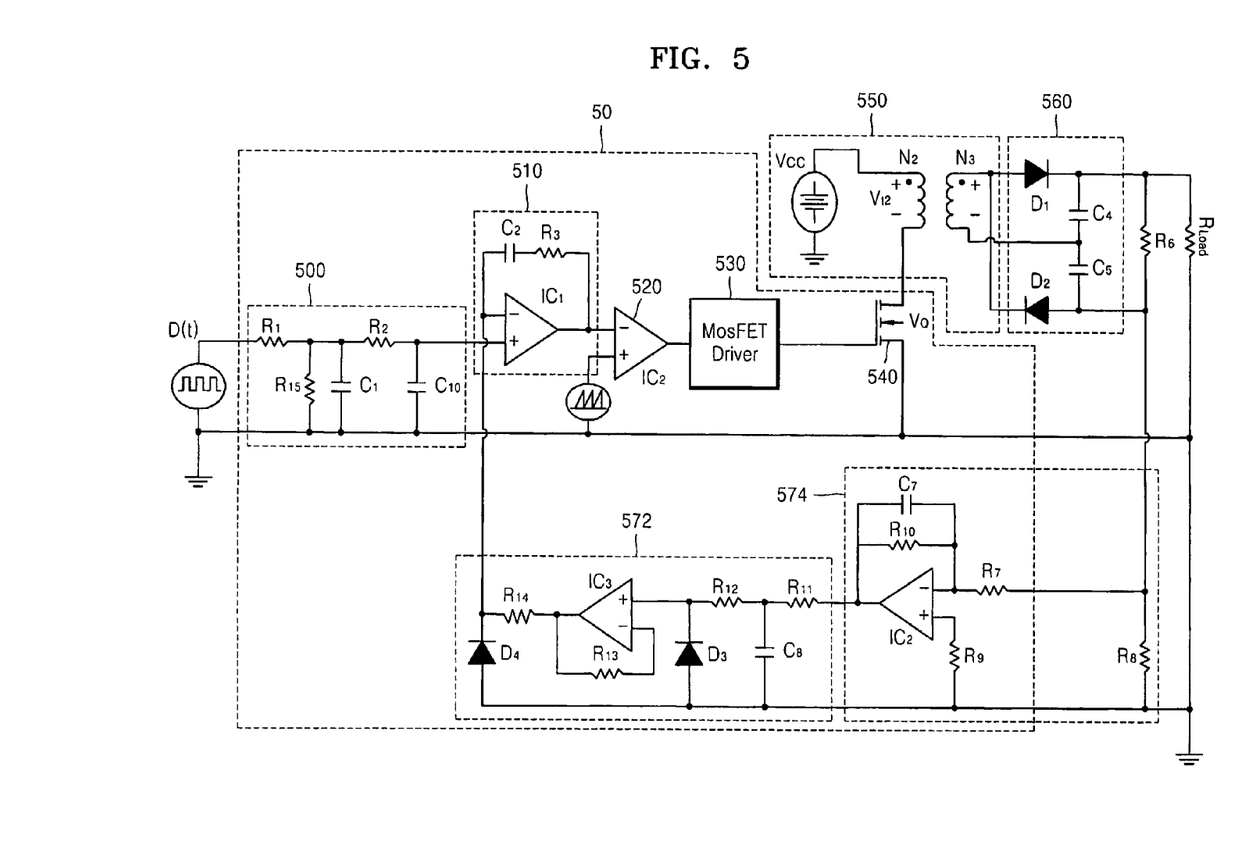
FIG. 5 is an illustration of a circuit diagram of an HVPS in an image forming apparatus including an analog control unit according to an exemplary embodiment of the present invention.

FIG. 5 is an illustration of a circuit diagram of an HVPS in an image forming apparatus including the analog control unit 40, according to an exemplary embodiment of the present invention. The LPF 400, voltage controller 410, PWM modulator 420, gate driver 430, switching component 440, voltage sensor 474, and protector & rectifier 472, included in the analog control unit 40 of FIG. 4, correspond to reference numbers 500, 510, 520, 530, 540, 574, and 572, included in the analog control unit 50 of FIG. 5, respectively. The transformer 450 and the voltage doubler 460 of FIG. 4 correspond to reference numbers 550 and 560 of FIG. 5, respectively.

An operation of the analog control unit 50 will now be schematically described with reference to FIG. 5. When a PWM signal having a predetermined duty ratio is input to an LPF 500, a DC level signal is output from the LPF 500 and becomes a reference input signal of a voltage controller 510. When a high-voltage output signal output from a voltage doubler 560 is sensed and feedbacked to the voltage controller 510, the voltage controller 510 amplifies an error signal obtained by differentiating the reference signal and the feedbacked signal. The amplified signal is input to a PWM modulator 520 with a predetermined carrier input signal, and a PWM signal having a predetermined duty ratio is output from the PWM modulator 520. The PWM signal is input to a gate driver 530 and driven as a gate signal of a switching component 540 by the gate driver 530. The signal input to the gate of the switching component 540 is switched by the switching component 540 and input to the primary coil of a transformer 550. The transformer 550 transforms the signal conducted to the primary coil to a secondary AC high voltage. The secondary AC high voltage is doubled by the voltage doubler 560, including a diode rectifier and capacitors, and then a DC high voltage is generated.

Figure 6:
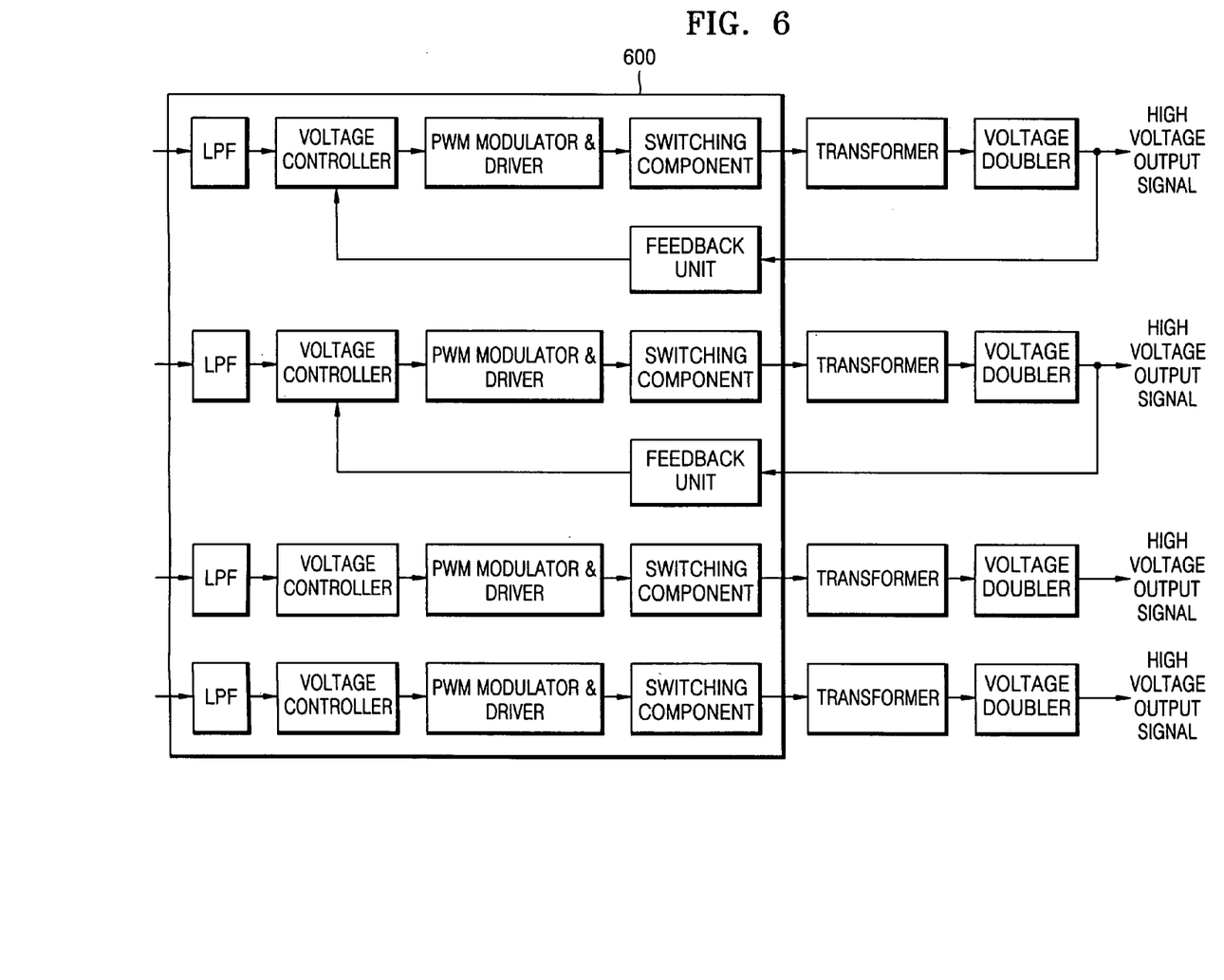
FIG. 6 is a block diagram of an exemplary implementation of an embodiment of the present invention, where a one-chip HVPS ASIC, which is a four-channel high voltage output analog control circuit, comprises four analog control apparatuses for the HVPS in the image forming apparatus in one-chip ASIC.
Figure 7:
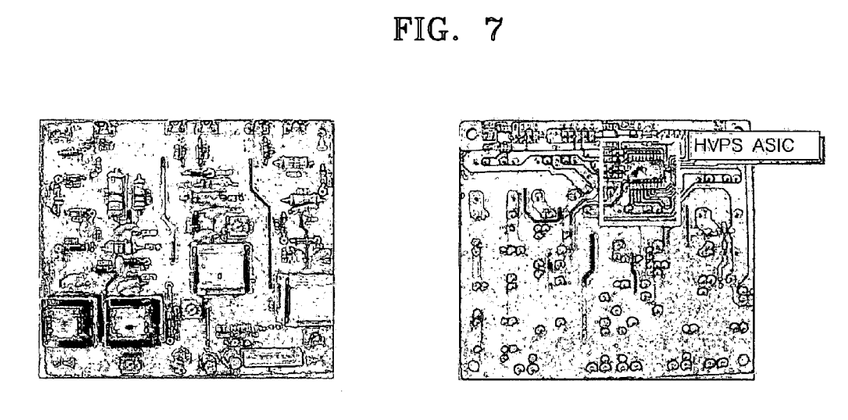
FIG. 7 is an exemplary embodiment of the present invention where an HVPS analog control unit comprises a one-chip ASIC.

Two or more analog control apparatuses for the HVPS in the image forming apparatus described above can be configured as a one-chip ASIC. FIG. 6 is a block diagram of a one-chip HVPS ASIC 600, which is a four-channel high voltage output analog control circuit, embodied by integrating four analog control apparatuses for the HVPS in the image forming apparatus into a one-chip ASIC. Some of the analog control apparatuses for the HVPS in the image forming apparatus can be double connected to each other. FIG. 7 is an exemplary embodiment of an HVPS analog control unit embodied as a one-chip ASIC.

As described above, in an analog control ASIC apparatus for an HVPS in an image forming apparatus according to exemplary embodiments of the present invention, space utilization, simplification of an assembly process, and cost reduction through mass production are possible by configuring a control unit in the primary side of a high-voltage transformer as one-chip analog ASIC instead of an assembly including a plurality of components. That is, the number of components can be reduced by configuring an RC filter, a voltage controller, a driver, and a transistor forming an analog control unit as a one-chip ASIC. Since a PWM signal input for each channel in a conventional main CPU is used as a PWM signal input, transplantation to a conventional method is excellent. Accordingly, the volume can be dramatically reduced by configuring a control unit comprised of conventional analog controllers as a one-chip ASIC.

In addition, since a mass-produced ASIC chip is used, a mass production efficiency can be enhanced by saving time required for controlling each time constant in conventional analog controllers.

Furthermore, analog control ASIC apparatuses can be applied to mono laser beam printers (LBPs) and TANDEM color LBPs using a DC high voltage, thereby resulting in space utilization and cost reduction.

Moreover, unlike a conventional hybrid IC method configuring only a portion of a logic control unit, the analog control ASIC apparatus maintains characteristics of an analog ASIC and has expandability according to various application methods since the analog control ASIC apparatus according to an exemplary implementation of the present invention may further include a switching component such as an FET.

While the invention has been shown and described with reference to certain exemplary embodiments thereof, it will be understood by those skill in the art that various changes in form and details may be made therein without departing from the spirit and scope of the invention as defined by the appended claims.

What is claimed is:

1. An analog control application specific integrated circuit (ASIC) apparatus for a high voltage power supply (HVPS) in an image forming apparatus, wherein the HVPS in the image forming apparatus comprises a transformer transforming an AC signal having a predetermined frequency to a high voltage signal and a voltage doubler outputting a DC high voltage for the HVPS in the image forming apparatus by rectifying and voltage doubling a secondary high voltage signal of the transformer, the analog control ASIC apparatus comprising:
   an analog control circuit configured as a one-chip ASIC for converting a DC level signal to a high frequency switching signal using a switching component and outputting the converted high frequency switching signal to a primary winding of the transformer, wherein the analog control circuit further comprises:
   a voltage controller for amplifying the DC level signal;
   a pulse width modulation (PWM) modulator for modulating a signal output from the voltage controller using a carrier signal; and
   a gate driver for driving a signal modulated by the PWM modulator as a signal input to the gate of the switching component,
   wherein the switching component receiving the driving signal of the gate driver through the gate, high frequency switches the received driving signal, and outputs the high frequency switched signal to the transformer.

2. The analog control ASIC apparatus of claim 1, wherein the switching component comprises a metal oxide semiconductor field effect transistor (MOSFET).

3. The analog control ASIC apparatus of claim 1, further comprising:
   a low pass filter (LPF) for converting a PWM signal having a duty ratio to a DC level signal and outputting the converted DC level signal to the voltage controller, wherein the DC level signal comprises a reference signal for controlling the high voltage output signal.

4. The analog control ASIC apparatus of claim 3, further comprising:
   a feedback unit for sensing the high voltage output signal and feeding back the sensed high voltage output signal to the voltage controller,
   wherein the voltage controller amplifies an error signal obtained by differentiating the reference signal and the output voltage of the voltage doubler sensed by the feedback unit.

5. The analog control ASIC apparatus of claim 4, wherein the high voltage output signal sensed by the feedback unit comprises a voltage or a current.

6. The analog control ASIC apparatus of claim 4, wherein the feedback unit comprises:
   a voltage sensor for sensing and filtering the high voltage output signal; and
   a protector-rectifier for buffering a signal sensed by the voltage sensor, clamping the buffered signal, and outputting the clamped signal to the voltage controller.

7. An analog control application specific integrated circuit (ASIC) apparatus for a high voltage power supply (HVPS) in an image forming apparatus, the analog control ASIC apparatus comprising:
   at least two analog control ASIC apparatuses as claimed in claim 1 for the HVPS in the image forming apparatus, which are configured as one-chip ASIC.

8. The analog control ASIC apparatus of claim 7, wherein said at least two analog control ASIC apparatuses for the HVPS in the image forming apparatus are connected to each other.

9. A method of controlling a high voltage power supply (HVPS) for an analog control application specific integrated circuit (ASIC), the method comprising:

transforming an AC signal having a predetermined frequency to a high voltage signal;

outputting a DC high voltage for the HVPS in the image forming apparatus by rectifying and doubling a secondary high voltage signal of a transformer; and configuring an analog control circuit as a one-chip ASIC for converting a predetermined DC level signal to a high frequency switching signal using a switching component and outputting the converted high frequency signal to a primary winding of the transformer, the method further comprising:

amplifying the DC level signal;

pulse width modulating the amplified signal output using a carrier signal;

driving the modulated signal via a gate driver to the gate of the switching component; and high frequency switching a driving signal received by the switching component and outputting the high frequency switched signal to the transformer.

10. The method of claim 9, further comprising:

converting the modulated signal having a duty ratio to a DC level signal and outputting the converted DC level signal to a voltage controller, wherein the DC level signal comprises a reference signal for controlling the high voltage output signal.

11. The method of claim 10, further comprising:

sensing the high voltage output signal and feeding back the sensed high voltage output signal to the voltage controller, wherein the voltage controller amplifies an error signal obtained by differentiating the reference signal and the output voltage of a voltage doubler sensed by a feedback unit.

12. The method of claim 11, wherein the high voltage output signal sensed by the feedback unit comprises a voltage or a current.

13. The method of claim 11, further comprising:

sensing and filtering the high voltage output signal; and buffering a signal sensed by the voltage sensor, clamping the buffered signal, and outputting the clamped signal to the voltage controller.

* * * * *